United States Patent [19]

Werner et al.

[11] Patent Number: 5,529,439
[45] Date of Patent: Jun. 25, 1996

[54] MILLING CUTTER HEAD WITH SERRATED CARTRIDGES

[75] Inventors: Heinz Werner, Gävle; Åke Almersand, Årsunda, both of Sweden

[73] Assignee: Sandvik AB, Sandviken, Sweden

[21] Appl. No.: 233,332

[22] Filed: Apr. 26, 1994

[30] Foreign Application Priority Data

Apr. 27, 1993 [SE] Sweden ......................... 9301399

[51] Int. Cl.⁶ ........................................ B23C 5/24
[52] U.S. Cl. ........................................... 407/39
[58] Field of Search ..................... 407/37–39, 45, 407/46, 79, 86–88

[56] References Cited

U.S. PATENT DOCUMENTS

| | | |
|---|---|---|
| 1,962,725 | 6/1934 | Severson . |
| 2,037,642 | 4/1936 | Scribner . |
| 2,229,112 | 1/1941 | Miller et al. ............... 407/38 |
| 2,325,746 | 8/1943 | Curtis ........................ 407/45 |
| 2,900,704 | 8/1959 | Sweet . |
| 3,214,825 | 11/1965 | Williams . |
| 3,501,822 | 3/1970 | Williams . |
| 3,946,474 | 3/1976 | Hahn et al. ............... 407/37 |

FOREIGN PATENT DOCUMENTS

| | | |
|---|---|---|
| 0103480 | 3/1984 | European Pat. Off. . |
| 282090 | 9/1988 | European Pat. Off. ........ 407/37 |
| 674112 | 4/1939 | Germany . |
| 1102526 | 3/1961 | Germany . |

*Primary Examiner*—Daniel W. Howell
*Assistant Examiner*—Kenneth J. Hansen
*Attorney, Agent, or Firm*—Burns, Doane, Swecker & Mathis

[57] ABSTRACT

A milling cutter head intended for metal machining, particularly aluminum, comprises grooves in which are mounted cutting insert-carrying cartridges and spacer plates. The sides of the cartridge and the spacer plate that are in contact are serrated in the same direction. The other side of the spacer plate and the side surface of the groove being in contact with it are serrated in a direction which is substantially perpendicular to the first mentioned serration. In this way, it is possible to independently and precisely adjust each of the axial and radial directions of the cutting edge.

12 Claims, 3 Drawing Sheets

MILLING CUTTER HEAD WITH SERRATED CARTRIDGES

BACKGROUND AND SUMMARY OF THE PRESENT INVENTION

The present invention relates generally to a milling cutter head in which the cutting inserts are carried by cartridges placed in grooves around the periphery of the head. Also, a spacer plate is placed in each groove. In accordance with the present invention the cutting edges can be finely adjusted radially and axially by forming the cartridges and the spacer plates with serrations according to the present invention.

Cutting tools with cutting elements placed circumferentially around the envelope surface of a milling cutter head are described in, for instance, DE-B-1 102 526. According to this patent specification, the cutting elements are fixed by a serrated Wedge and a screw. However, this construction does not allow any precision adjustment of the cutting edge because any change in the radial or axial position is stepwise and not continuous, each step representing the breadth of one serration. Moreover, this construction does not provide any safety against centrifugal forces that could separate the elements.

Also, in U.S. Pat. No. 3,214,825, a fastening arrangement is disclosed for cutting elements in a milling cutter body, comprising a plurality of serrated surfaces with the serrations directed axially, radially and diagonally. Although this construction makes possible an adjustment in both axial and radial directions, it does not permit a linear adjustment or an independent adjustment in one of the two directions, i.e., the two adjustment directions are interdependent. Thus, a certain adjustment in, e.g., the radial direction also results in a certain diagonal, and thereby also axial displacement. Moreover, this adjusting and fixing arrangement requires a number of different pieces resulting in an unnecessarily complicated construction. Inter alia, it comprises two weak break wedges which often rupture due to fatigue. Furthermore, this construction is not sufficiently safe from the effects of centrifugal forces.

Thus, a first object of the present invention is to provide a milling tool that makes possible a very precise adjustment of the cutting edges, both axially and radially.

A further object of the present invention is to provide a milling tool that makes possible a precise and mutually fully independent axial and radial adjustment of the cutting edges.

Still a further object of the present invention is to eliminate any risk that any of the parts in the fastening arrangement is suddenly flung out due to centrifugal force.

Still another object of the present invention is to obtain a well balanced milling cutter body which is not influenced at high cutting speeds, these being common, for instance machining aluminum.

Still another object of the present invention is to attain a precise adjusting of the cutting edges in the milling cutter head axially and radially, with as few separate parts as possible.

A still further object of the present invention is to provide a simple and stable cutting insert fastening construction, with as few separate components as possible.

These and further objects have been achieved in a surprising manner by constructing a milling tool that includes the features of the present invention.

BRIEF DESCRIPTION OF THE DRAWING FIGURES

For illustrative but non-limiting purposes, the invention will now be further described in relation with the appended drawings which show a preferred embodiment, wherein like members bear like reference numerals, and wherein.

DETAILED DESCRIPTION OF THE PREFERRED EMBODIMENT

Figure 1:
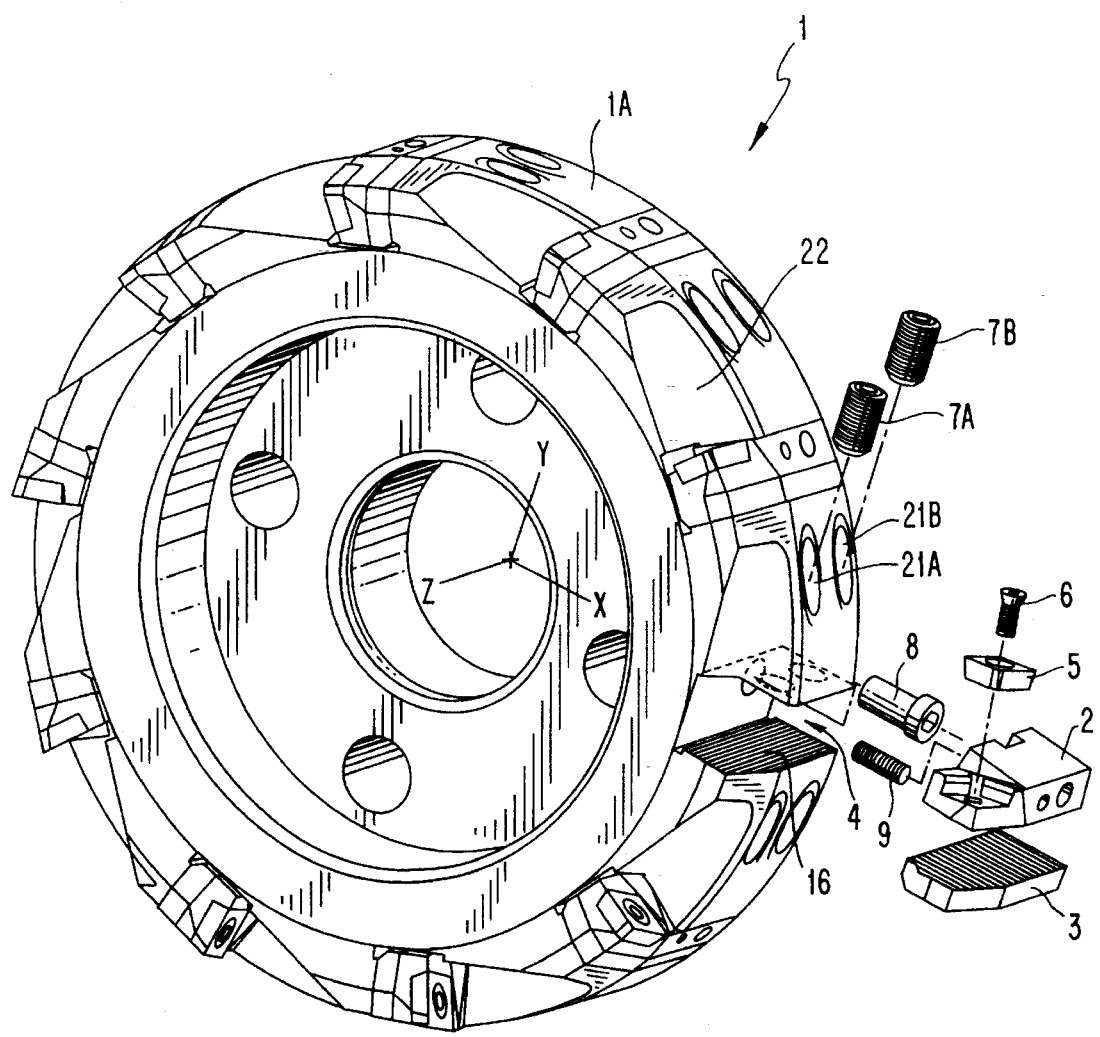
FIG. 1 is a perspective view of a milling cutter head according to the present invention with one cutting position exploded.

A milling cutter head generally designated by 1 comprises a rotary body 1A which rotates around its central rotational axis Z. Around a peripheral envelope surface of the body 1A are provided recessed grooves 4, whose extension direction is substantially parallel to the rotational axis Z of the milling cutter head. Each groove 4 is intended to take up an insert-carrying cartridge 2 and a spacer plate 3. The cartridge 2 comprises an insert pocket 14 for the fastening of a suitable cutting insert 5 by a locking screw 6. The nature of the cutting insert is not an essential feature of the present invention. However, a suitable application area for the present invention is the machining of aluminum with cutting inserts comprising a diamond element at one of the cutting corners of the inserts. According to the illustrated embodiment, the cutting insert is a single-sided indexable insert of square basic form. In the milling cutter head, in front of each cutting insert in the direction of rotation, there is provided a chip recess or chip pocket 22.

Figure 2:
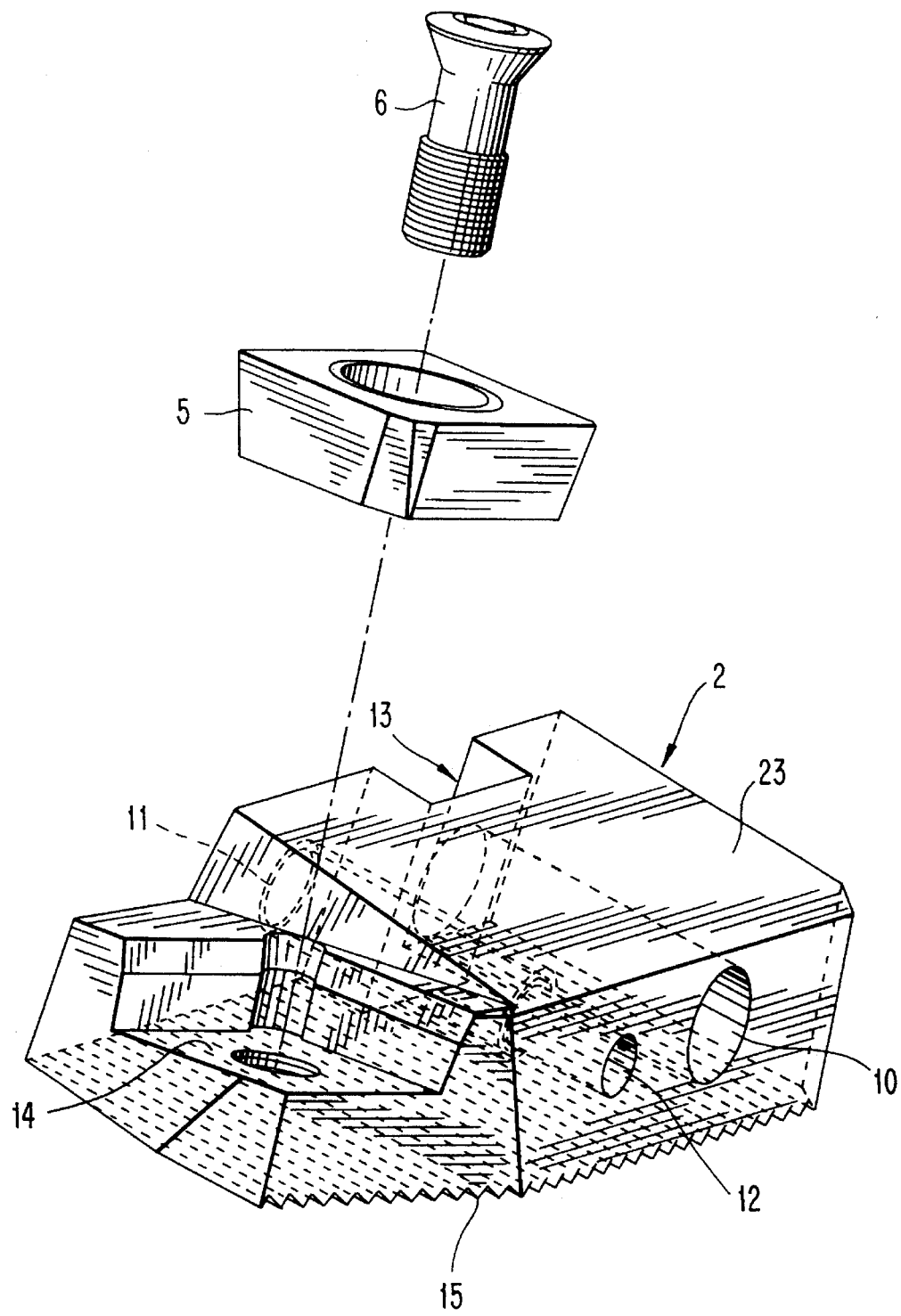
FIG. 2 is an exploded view of an insert-carrying cartridge according to the present invention.
Figure 4:
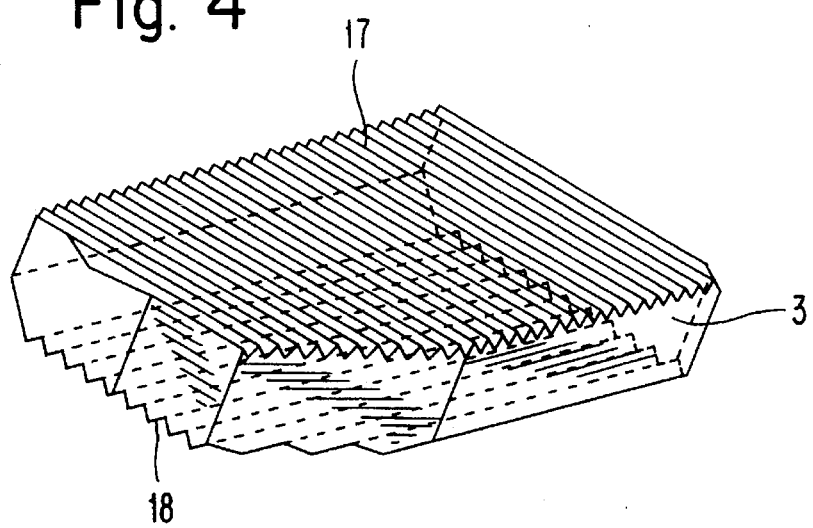
FIG. 4 is an exploded view of a spacer plate according to the present invention.

The surfaces of the cartridge 2 and the spacer plate 3 facing each other are formed with serrations 15 and 17, respectively (FIGS. 2 and 4). Preferably, these surfaces are serrated in their entireties. According to the illustrated embodiments, these serrations are substantially radial. Further, they are of course formed to fit well in each other, i.e., they are shaped with the same ridge width, the same top angles and substantially the same depth between the ridges. The distance between two adjacent ridges is not critical for the present invention, however, it is suitably between 0.5 and 3.0 mm, and preferably between 1.0 and 2.0 mm.

A surface 18 of the spacer plate 3, circumferentially opposite to the surface 17, is also provided with serrations, preferably in its entirety. The serration direction of the surface 18 is substantially perpendicular to the one on surface 17, i.e., it is substantially parallel to the rotational axis Z of the milling cutter head. The angle between the two serration directions should not deviate by more than 2°, preferably by no more that 0° 30', from a right angle, since radial and axial fine adjustment then can no longer be made independently of each other. The serrated surface 18 cooperates with serrations on the surface 16 of the groove 4. Concerning the form and the measures of these serrations, the same is applicable as mentioned above in relation with the serrations 15 and 17.

Alternatively, the serration directions can be swapped. Thus, according to that embodiment, the serrations 15 and 17 are substantially parallel to the rotation axis of the milling cutter body, while the serrations 16 and 18 are substantially perpendicular thereto.

Figure 3:
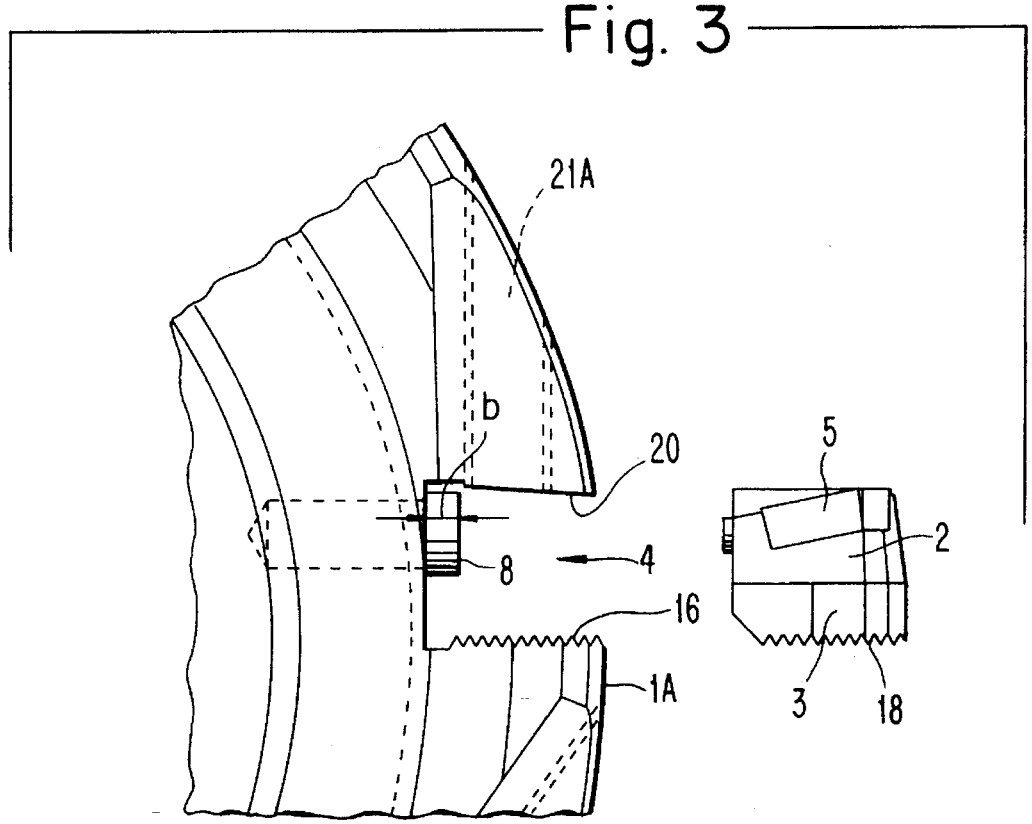
FIG. 3 is a view of a cartridge groove with the cartridge and spacer plate shown from above.

As is best seen in FIG. 3, the two sidewalls 16 and 20 of cartridge groove 4 converge towards each other radially outwards. In this way, a guarantee is obtained against the cartridge and the spacer plate being radially flung out of the groove by the centrifugal force. The angle between the surfaces 16 and 20 can be between 2° and 6°, and preferably between 3.5° and 4.5°.

A manual actuator in the form of a tap 8 is inserted into an orifice in the bottom surface (in a radial direction) of the groove 4, the head of this tap being eccentric in relation to the smooth, cylindrical part of the tap. This eccentric head is placed into a recess or a through-groove 13 on the back of the cartridge. The eccentric head is suitably provided with a hexagonal hole or similar for turning and axially adjusting the cutting edge on the cutting insert 5. This turning of the tap 8 is accomplished by sticking a hexagonal key or similar through the hole 10. The diameter of this hole is smaller than the diameter of the eccentric head, in order to radially secure the tap 8.

For radial adjustment of the cutting edge, a manual actuator in the form of a screw 9 is used, which is threaded into a threaded hole 11 in the cartridge. The screw 9 is also provided with a hexagonal hole or similar, in order to make a turning of it possible by a suitable key. This key is inserted through a hole 12, which has a smaller diameter than the threaded part 11. This smaller diameter brings two advantages; firstly, the screw 9 is radially secured, and secondly, it is easier to hit the hexagonal hole on the screw 9. Alternatively, the cartridge can be provided with holes for two screws 9.

Since the groove 4 tapers radially outwards, the cartridge and the spacer plate have to be inserted into the groove axially. In order to at all make the mounting of cartridge and spacer plate possible, a certain free gap is necessary between the unity cartridge-spacer plate and the sidewalls 16 and 20 of the groove, in order to get past the head of the eccentric tap 8 which protrudes into the groove 4, with the radially inner side of the cartridge, whereafter the cartridge can be pushed radially inwards, when the groove 13 has come in level with the eccentric head, up to abutment with the bottom surface of the groove 4. If the angle between the surfaces 16 and 20 is called $\alpha$ and the head of the eccentric tap 8 has a thickness b, then a gap of $b \sin\alpha$ between the cartridge surface 23 and the groove surface 20 is necessary to get past the head of the eccentric tap, e.g., if b is 4 mm and $\alpha$ is 4°, then theoretically the gap should be at least 0.28 min. Thereafter, the cutting edge is precisely adjusted radially by the screw 9 and axially by the eccentric tap 8.

The adjusting in these two directions can be done completely independently from each other, wherein the desired position is suitably made with a so called thousandth gauge. When the predetermined axial and radial positions have been attained, the cutting position is fixed by threaded clamping screws 7A and 7B, which are threaded into threaded through-holes 21A and 21B, respectively, in the head body. The clamping screws 7A and 7B are brought to exert a direct pressure upon the substantially smooth surface 23 of the cartridge, whereby the cartridge and the spacer plate, and consequently also the cutting edge, are fastened and fixed in the desired position.

According to the illustrated embodiment, there are two clamping screws 7A and 7B. However, it is also feasible to have, for instance, one or three clamping screws 7. Since the clamping screws 7 are mounted in a position substantially perpendicular to the radial direction, they are also secured in their positions against centrifugal forces. Besides, the screws have the advantage of not negatively influencing the outbalance of the milling cutter body.

By the above described construction a measure accuracy of 2 µm has been achieved for the positioning of the cutting edges, both radially and axially. The adjustment range in the axial and radial direction respectively, can be from 0.5 to 1.5 mm. The achieved, precise adjusting in two dimensions has made it possible to obtain very smooth surfaces on the machined workpiece, for instance in aluminum machining. Furthermore, the possibility of after-adjusting the cutting position as often as desired due to the cutting edge being worn has significantly improved cutting economy, since the same cutting insert can be reground several times. This is very advantageous when using expensive cutting inserts, in particular those with an inlay element of diamond or cubic bore nitride at one of the corners of the cutting insert.

The principles, preferred embodiment and mode of operation of the present invention have been described. Variations and changes may be made without departing from the scope of the present invention as defined in the claims appended hereto.

What is claimed is:

1. A milling cutter head comprising, a rotary body defining an axis of rotation, cutting inserts carried by cartridges having insert receiving seats, said cartridges placed in grooves spaced around an outer periphery of the body; a spacer plate being placed in each groove one side of each groove being serrated and in contact with a first correspondingly serrated side of the spacer plate; one side of the cartridge being serrated and in contact with a second correspondingly serrated side of the spacer plate, the second side being on an opposite side of the spacer plate from the first serrated side of the spacer plate in a circumferential direction; the serrations on the two sides of the spacer plate disposed in respective directions arranged substantially perpendicular to each other, a first of the directions being substantially parallel to the axis, and a second of the directions being substantially radial with respect to the axis; a first manual actuator engaged directly between the cartridge and the body for displacing the cartridge in the first direction; a second manual actuator engaged directly between the cartridge and the body for displacing the cartridge in the second direction; the first and second actuators being arranged so that the cartridge is displaceable in the first direction without being displaced in the second direction in response to actuation of the first actuator, and is displaceable in the second direction without being displaced in the first direction in response to actuation of the second actuator.

2. Milling cutter head according to claim 1, wherein two sides of each groove, facing each other in a circumferential direction, converge in a radially outward direction in order to secure the cartridge and the spacer plate against centrifugal forces.

3. Milling cutter head according to claim 2, wherein an angle of convergence of the side surfaces of the groove is between 2° and 6°.

4. Milling cutter head according to claim 1, the first actuator comprising an eccentric tap for axially adjusting the cartridge, said tap being arranged in the body at a location radially inwards in relation to the cartridge, a head of the eccentric tap being in a recess formed on a radially inner side of the cartridge, a hole ending in said recess being provided in the cartridge, said hole being intended for insertion of a suitable key for turning the eccentric tap.

5. Milling cutter head according to claim 4, further comprising at least one clamping screw arranged movably in the body for pressing against a second side of the cartridge opposite to the serrated side of the cartridge, said second side being substantially smooth, said at least one clamping screw fastening both the cartridge and the spacer plate in the groove.

6. Milling cutter head according to claim 4, wherein a gap is provided between a second, smooth side of the cartridge and an adjacent side surface of the groove, the width of said gap being greater than or equal to b sinα, where b is the thickness of the head of the eccentric tap and α is the angle between two facing side surfaces of the groove.

7. Milling cutter head according to claim 1, the second comprising a screw for radially adjusting the cartridge, the screw being arranged in a substantially radially extending through-hole in the cartridge.

8. Milling cutter head according to claim 1, further comprising at least one clamping screw arranged movably in the body for pressing against a second side of the cartridge opposite to the serrated side of the cartridge, said second side being substantially smooth, said at least one clamping screw fastening both the cartridge and the spacer plate in the groove.

9. Milling cutter head according to claim 8, wherein a gap is provided between the second side of the cartridge and an adjacent side surface of the groove.

10. Milling cutter head according to claim 1, wherein an angle is provided between two facing side surfaces of the groove, said angle being between 2° and 6°.

11. Milling cutter head according to claim 1, wherein an angle is provided between two facing side surfaces of the groove, said angle being between 3.5° and 4.5°.

12. Milling cutter head according to claim 1, wherein the first actuator comprises a threaded member threadedly connected to the body and engageable with the cartridge; the second actuator comprises a threaded member threadedly connected to the cartridge and engageable with the body.

* * * * *